(12) United States Patent
Kirchner et al.

(10) Patent No.: US 10,216,265 B1
(45) Date of Patent: Feb. 26, 2019

(54) SYSTEM AND METHOD FOR HYBRID OPTICAL/INERTIAL HEADTRACKING VIA NUMERICALLY STABLE KALMAN FILTER

(71) Applicant: Rockwell Collins, Inc., Cedar Rapids, IA (US)

(72) Inventors: William T. Kirchner, Leesburg, VA (US); Bobby D. Foote, Marion, IA (US); Christopher L. George, Winchester, VA (US); Ramachandra J. Sattigeri, Ashburn, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 17 days.

(21) Appl. No.: 15/670,934

(22) Filed: Aug. 7, 2017

(51) Int. Cl.
| | | |
|---|---|---|
| *G06F 3/01* | (2006.01) | |
| *G06T 7/70* | (2017.01) | |
| *G01P 15/08* | (2006.01) | |
| *G01P 15/105* | (2006.01) | |
| *B64D 43/00* | (2006.01) | |

(52) U.S. Cl.
CPC .............. *G06F 3/012* (2013.01); *B64D 43/00* (2013.01); *G01P 15/08* (2013.01); *G01P 15/105* (2013.01); *G06T 7/70* (2017.01); *G06T 2207/10016* (2013.01); *G06T 2207/30204* (2013.01)

(58) Field of Classification Search
USPC ........................................................ 382/103
See application file for complete search history.

(56) References Cited

U.S. PATENT DOCUMENTS

| | | |
|---|---|---|
| 5,645,077 A | 7/1997 | Foxlin |
| 5,812,257 A | 9/1998 | Teitel et al. |
| 6,162,191 A | 12/2000 | Foxlin |
| 6,176,837 B1 | 1/2001 | Foxlin |
| 6,311,129 B1 | 10/2001 | Lin |
| 6,361,507 B1 | 3/2002 | Foxlin |
| 6,377,401 B1 | 4/2002 | Bartlett |
| 6,408,245 B1 | 6/2002 | An et al. |
| 6,409,687 B1 | 6/2002 | Foxlin |
| 6,449,559 B2 | 9/2002 | Lin |
| 6,474,159 B1 | 11/2002 | Foxlin et al. |
| 6,480,152 B2 | 11/2002 | Lin et al. |
| 6,658,354 B2 | 12/2003 | Lin |
| 6,681,629 B2 | 1/2004 | Foxlin et al. |

(Continued)

*Primary Examiner* — Gregory F Cunningham
(74) *Attorney, Agent, or Firm* — Angel N. Gerdzhikov; Donna P. Suchy; Daniel M. Barbieri

(57) ABSTRACT

A system and related method for hybrid headtracking receives head-referenced pose data from a head-mounted IMU and platform-referenced or georeferenced position and orientation (pose) data from a platform-mounted IMU, determines error models corresponding to uncertainties associated with both IMUs, and performs an initial estimate of head pose relative to the platform reference frame based on the head-referenced and platform-referenced pose data. A numerically stable UD factorization of the Kalman filter propagates the estimated head pose data forward in time and corrects the initial head pose estimate (and may correct the error models associated with the head-mounted and platform-mounted IMUs) based on secondary head pose estimates, and corresponding error models, received from an optical or magnetic aiding device. The corrected head pose data is forward to a head-worn display to ensure high accuracy of displayed imagery and symbology.

20 Claims, 9 Drawing Sheets

(56) References Cited

U.S. PATENT DOCUMENTS

| | | | |
|---|---|---|---|
| 6,738,714 | B2 | 5/2004 | McCall et al. |
| 6,786,877 | B2 | 9/2004 | Foxlin |
| 6,820,025 | B2 | 11/2004 | Bachmann et al. |
| 7,000,469 | B2 | 2/2006 | Foxlin et al. |
| 7,046,215 | B1 | 5/2006 | Bartlett |
| 7,266,446 | B1 | 9/2007 | Pelosi |
| 7,301,648 | B2 | 11/2007 | Foxlin |
| 7,395,181 | B2 | 7/2008 | Foxlin |
| 7,409,290 | B2 | 8/2008 | Lin |
| 7,640,106 | B1 | 12/2009 | Stokar et al. |
| 7,672,781 | B2 | 3/2010 | Churchill et al. |
| 8,019,538 | B2 | 9/2011 | Soehren et al. |
| 8,165,844 | B2 | 4/2012 | Luinge et al. |
| 8,953,154 | B2 | 2/2015 | Galea et al. |
| 8,965,736 | B2 | 2/2015 | Horton et al. |
| 9,031,809 | B1* | 5/2015 | Kumar ................. G01C 21/165 702/150 |
| 9,891,705 | B1* | 2/2018 | Lahr ....................... G06F 3/012 |
| 2010/0045701 | A1* | 2/2010 | Scott ....................... G01S 5/163 345/633 |
| 2013/0237811 | A1* | 9/2013 | Mihailescu ............ A61B 5/064 600/424 |
| 2017/0358131 | A1* | 12/2017 | Weiss .................... G06F 3/0416 |

* cited by examiner

212 — Generating, via a Kalman filter associated with the controller, time-propagated pose data based on the first estimated pose data, the first error model, and the second error model 214 — Receiving, via the controller, second estimated pose data from at least one aiding device coupled to the controller, the aiding device rigidly mounted to at least one of the head and the mobile platform 216 — Determining, via the controller, at least one third error model associated with the second estimated pose data 218 — Generating, via the Kalman filter, at least one of corrected pose data and a corrected error model based on the time-propagated pose data, the second estimated pose data, and the third error model

*FIG. 6B*

SYSTEM AND METHOD FOR HYBRID OPTICAL/INERTIAL HEADTRACKING VIA NUMERICALLY STABLE KALMAN FILTER

BACKGROUND

For a head-worn display unit (HWD; also head-mounted or helmet-mounted display) to accurately display aircraft or georeferenced symbology and imagery, the HWD must have accurate head pose data: the position and orientation of the head (e.g., upon which the HWD is worn, and with which the HWD itself moves) relative to a platform reference frame. For example, an aircraft (or ground-based vehicle, or other like mobile platform) may move relative to a georeferenced frame (e.g., WGS 84, PZ-90, or other frames) while the head of the aircraft's pilot may move relative to the aircraft reference frame.

Head pose may be estimated by inertial measurement units (IMU) configured to detect and report accelerations, angular rates, or changes in velocity and orientation over time. For example, a first IMU may be rigidly mounted to (and may estimate and track the relative position and orientation of) the aircraft, and a second IMU (independent of the first IMU) may be rigidly mounted to (and may estimate and track the relative position and orientation of) the head/HWD. To arrive at an accurate head pose estimate by differencing these two IMUs (relative navigation) requires a means of correcting, or compensating for, uncertainties or errors associated with either IMU. Aiding devices may provide position and orientation (pose) measurements in six degrees of freedom (6DOF), which serve as a means of correcting, or compensating for, the inherent drift of both IMUs, solving the relative navigation problem and differencing the first and second IMUs, achieving accurate head pose estimates relative to the platform reference frame.

SUMMARY

In one aspect, embodiments of the inventive concepts disclosed herein are directed to a hybrid (optical-aided, magnetic-aided, or both) headtracking system incorporating a numerically stable Kalman filter incorporating UD-factorization, which provides accurate head pose data to a head-worn display (HWD) of the HWD wearer's head relative to an aircraft or like mobile platform. The system may receive platform-referenced pose data (relative to the platform frame) from a high integrity (e.g., georeferenced) IMU rigidly mounted to the aircraft. The system may receive head-referenced head pose data (relative to the head frame) from a head-mounted IMU (e.g., helmet-mounted). The system may, via one or more control processors, generate an estimate of the head pose relative to the platform frame based on the head-referenced and platform-referenced pose data. The control processors may determine error models for the inherent drift error associated with both the head-mounted and platform-mounted IMUs. The system may receive a secondary (e.g., low-rate) pose estimate from aiding devices rigidly mounted to the head and mobile platform (e.g., a camera and a set of fiducial markers, or a magnetometer and a set of magnetic sources) and determine error models for the inherent drift error of the aiding devices. The system may implement the numerically stable Kalman filter by propagating forward in time the estimated head pose data along with the head-mounted and platform mounted error models. The system may correct the estimated pose data and corresponding error models based on the secondary pose estimate.

In a further aspect, embodiments of the inventive concepts disclosed herein are directed to a head-worn display (HWD) (e.g., helmet-mounted display) incorporating a hybrid headtracking system with a numerically stable Kalman filter incorporating UD-factorization. The HWD controller may receive platform-referenced pose data from a high integrity IMU rigidly mounted to an aircraft or like mobile platform. The control processors may receive head-referenced head pose data (relative to the head frame) from a head-mounted IMU (e.g., helmet-mounted). The control processors may generate an estimate of the head pose relative to the platform frame based on the head-referenced and platform-referenced pose data. The control processors may determine error models for the inherent drift error associated with both the head-mounted and platform-mounted IMUs. The control processors may receive a secondary (e.g., low-rate) pose estimate from aiding devices rigidly mounted to the head and mobile platform (e.g., a camera and a set of fiducial markers, or a magnetometer and a set of magnetic sources) and determine error models for the inherent drift error of the aiding devices. The control processors may implement the numerically stable Kalman filter by propagating forward in time the estimated head pose data along with the head-mounted and platform mounted error models. The control processors may correct the time-propagated estimated pose data based on the secondary pose estimate and corresponding error model. The control processors may forward the corrected head pose data to the HWD display processors, which may display imagery and symbology to the user based on the corrected head pose data.

In a still further aspect, embodiments of the inventive concepts disclosed herein are directed to a method for hybrid headtracking via a numerically stable Kalman filter incorporating UD-factorization. The method may include receiving, via a controller connected to a head-worn display (HWD), platform-referenced pose data from a high-integrity IMU rigidly mounted to an aircraft or like mobile platform and associated with a platform reference frame. The method may include receiving, via the controller, head-referenced pose data (associated with a head reference frame from a head-mounted IMU rigidly mounted to a head of a user. The method may include determining, via the controller, error models based on the inherent drift of the platform-referenced and head-referenced IMUs. The method may include generating, via the controller, estimated head pose data based on the head-referenced and platform-referenced pose data, the estimated head pose data corresponding to the head and relative to the platform frame. The method may include generating, via the Kalman filter, time-propagated pose data based on the estimated head pose data and the respective error models corresponding to the head-referenced pose data and the platform-referenced pose data. The method may include receiving, via the controller, secondary estimated pose data from aiding devices (e.g., an optical or magnetic tracker) rigidly mounted to the mobile platform and the head. The method may include determining, via the controller, an error model corresponding to the secondary estimated pose data. The method may include generating, via the Kalman filter, corrected pose data or corrected associated error models by updating the time-propagated pose data based on the secondary estimated pose data (received from the aiding devices) and the corresponding error model.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 6A through 6C illustrate an exemplary embodiment of a method according to the inventive concepts disclosed herein.

DETAILED DESCRIPTION OF EXEMPLARY EMBODIMENTS

Figure 1:
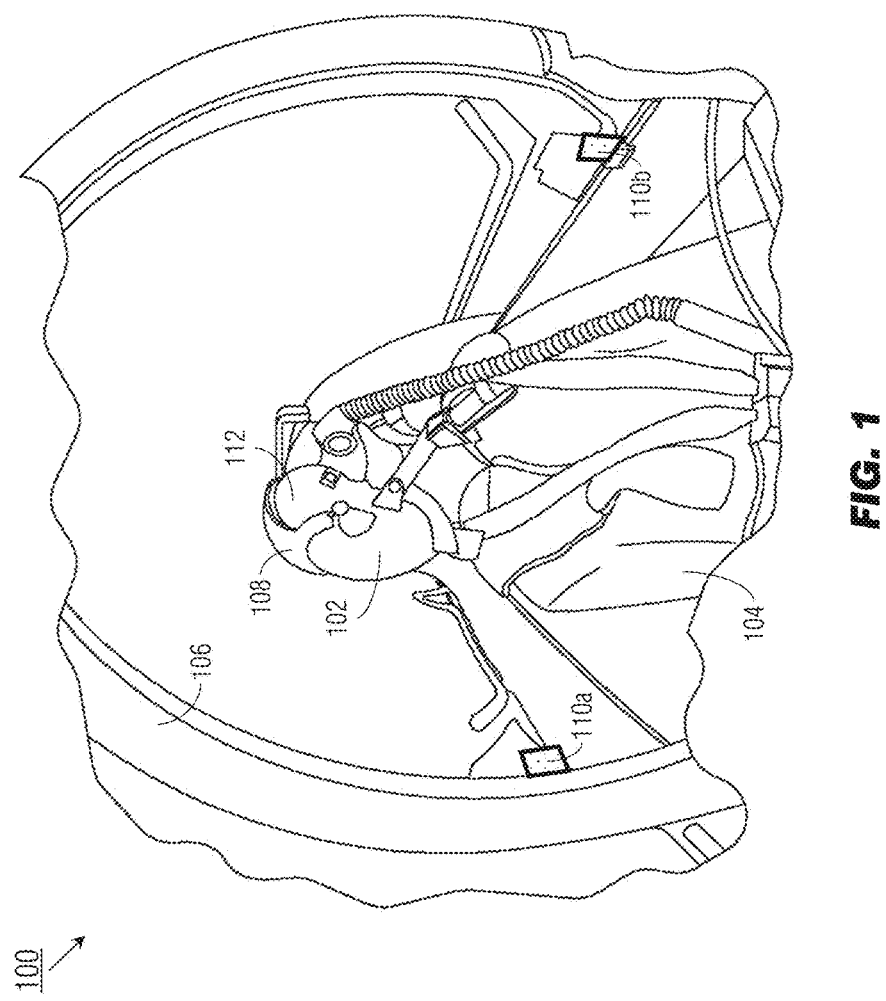
FIG. 1 illustrates an exemplary embodiment of a hybrid headtracking system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for hybrid headtracking, whereby the relative navigation problem is solved, and the integrity of flight cues, imagery, and symbology displayed via head-worn display (HWD) is ensured, by implementing a numerically stable UD factorization of the Kalman filter to provide high accuracy platform-referenced or georeferenced head pose data, correcting for the inherent drift of inertial measurement units used to estimate the head pose.

Referring to FIG. 1, an exemplary embodiment of a hybrid headtracking system 100 incorporating a numerically stable Kalman filter may include a head-mounted inertial measurement unit (IMU; hIMU) rigidly mounted to a helmet (102) worn by a user (104) and a platform-mounted IMU (pIMU) rigidly mounted to an aircraft (106) or other like mobile platform operated by the user 104 (e.g., pilot). The hybrid headtracking system 100 may implement the numerically stable Kalman filter (via control processors incorporated into the helmet 102) to solve the relative navigation problem via an optical aiding device (including a camera 108 (e.g., an electro-optical (E/O) camera) rigidly mounted to the helmet 102 and fiducial markers 110a-b rigidly mounted to the aircraft 106. The relative navigation problem involves the determination of an accurate relative position and orientation (pose) of the head of the user 104 relative to the aircraft 106. Alternatively, if the platform-mounted IMU is aided by a georeferenced position sensor, such as a high-integrity GPS receiver or similar satellite-based navigational receiver (e.g., GLASS, GLONASS, Galileo), the relative head pose data may be transformed to georeferenced head pose data relative to the appropriate georeferenced frame (e.g., WGS84, PZ90).

For example, the helmet 102 may incorporate a head-worn display 112 (HWD) for displaying flight guidance cues (e.g., imagery and symbology) to the user 104, matching the displayed guidance cues to the current head pose of the user to the extent that objects positioned below the user 104 while inflight may be displayed even though said objects would not otherwise be physically visible to the user (e.g., obscured by the aircraft itself). For the HWD 112 to accurately display guidance cues (avoiding the display of hazardously misleading information (HMI)), high integrity of head pose estimates based on the head-mounted and platform-mounted IMUs must be assured. As with any IMU, both the head-mounted IMU and platform-mounted IMU present a degree of inherent drift error that must be corrected or compensated for. To achieve head pose estimates of sufficient accuracy to satisfy integrity requirements, the probability of displaying HMI must be kept sufficiently low (e.g., $1e^{-5}$/hr to $1e^{-7}$/hr).

For example, HMI may be defined as a 6-degrees-of-freedom (6DOF; e.g., three position axes (x, y, z) and three rotational axes (roll, pitch, yaw)) head pose estimate whose error exceeds a value on the order of 3-20 milliradians (mrad) in orientation and 0.5-4 inches in position. The sensor fusion application of a conventional HWD (having a head-mounted size, weight, and power (SWaP) platform), via which inertially derived pose estimates are aided by some type of computer vision (e.g., optical sensors), may fail to meet these integrity requirements.

Such high-integrity navigation state estimation is based on being able to accurately estimate any uncertainties in the system. These uncertainty estimates may take the form of statistically representative uncertainties, or accuracy/integrity bounds imposed on the navigation state estimate itself (e.g., the above-noted HMI probability bounds). Similarly, any uncertainty of relevant physical quantity (e.g., measurement noise, calibration error, sensor locations) must be properly characterized and propagated through the estimation process. For example, errors can be calibrated for, and their magnitude reduced to negligible effect downstream. Alternatively, errors can be estimated and accounted for. As yet another alternative, the contributions of error sources may be included in the estimation process and their effects accounted for downstream. Any error sources affecting the navigation state estimate to a non-negligible degree must be modelled or otherwise addressed, or the calculated uncertainty of the navigation state cannot be trusted.

Figure 2A:
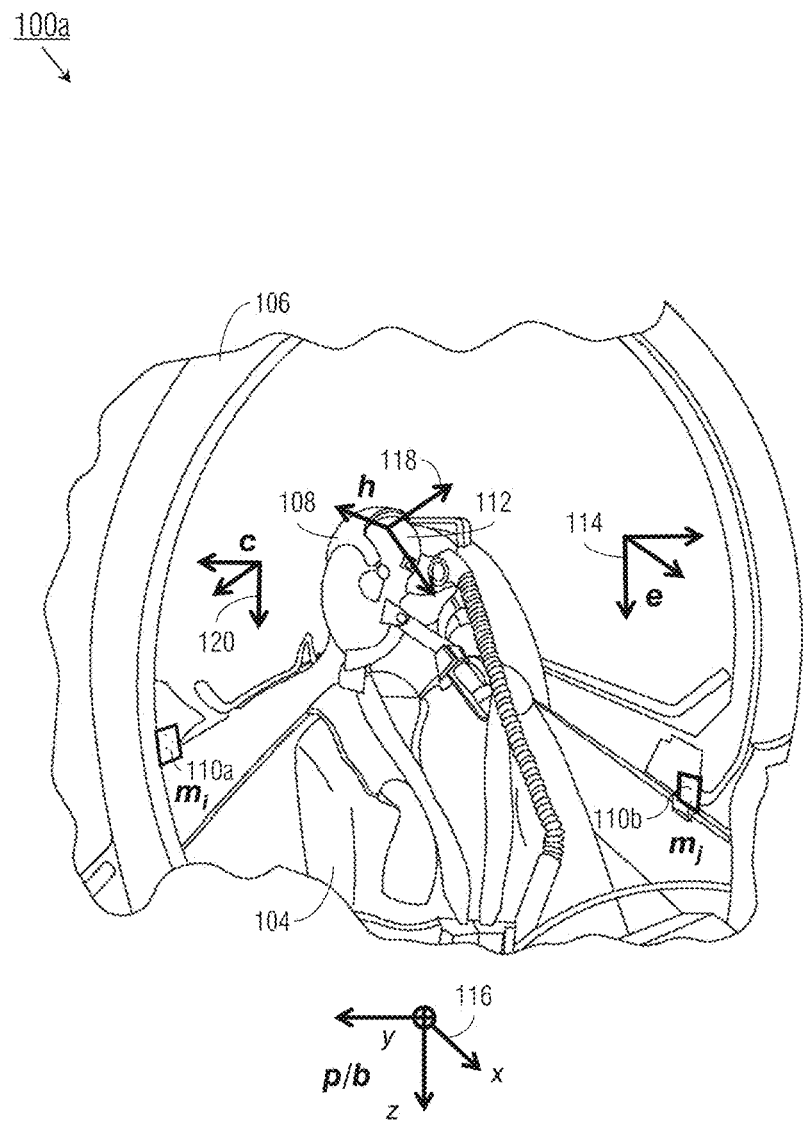
FIG. 2A illustrates reference frames of the system of FIG. 1.

Referring now to FIG. 2A, the hybrid headtracking system 100a may be implemented and may function similarly to the system 100 of FIG. 1, except that the various components of the hybrid headtracking system 100a may be associated with various reference frames, relative to which pose data (of the head of the user 104, or of the aircraft 106) may be determined. For example, the earth frame e (114) may include any georeferenced navigation frame (e.g., WGS84, PZ-90) relative to the earth itself. The platform frame p (116) may be rigidly mounted to the aircraft 106 (or ground-based vehicle, or appropriate like mobile platform) and describe the position of objects in the cockpit. In exemplary embodiments, the relative navigation problem may be expressed as determining an accurate pose of the head of the user 104 relative to the platform frame p (116). The platform frame 116 may be equivalent to, or may represent a fixed translation and/or rotation from, the aircraft body frame b (and may be defined consistently with the Society of Automotive Engineers (SAE) standard body frame, wherein the x-axis is associated with a forward axis, the y-axis with a rightward axis, and the z-axis with a downward axis). The head frame h (118) may be rigidly attached to the HWD 112 (and/or the helmet 102 worn by the user 104). The camera frame c (120) may also be rigidly attached to the HWD 112 (e.g., at a fixed translation and/or rotation from the head frame 118); the camera frame 120 may be defined by the focal point of the camera 108, and the x-axis of the camera frame 120 defined by the optical axis of the camera. Each fiducial marker $m_i$, $m_j$ (110a-b) may be rigidly mounted to the aircraft 106 and thus may be associated with a fixed position and orientation relative to the platform frame 116.

Figure 2B:
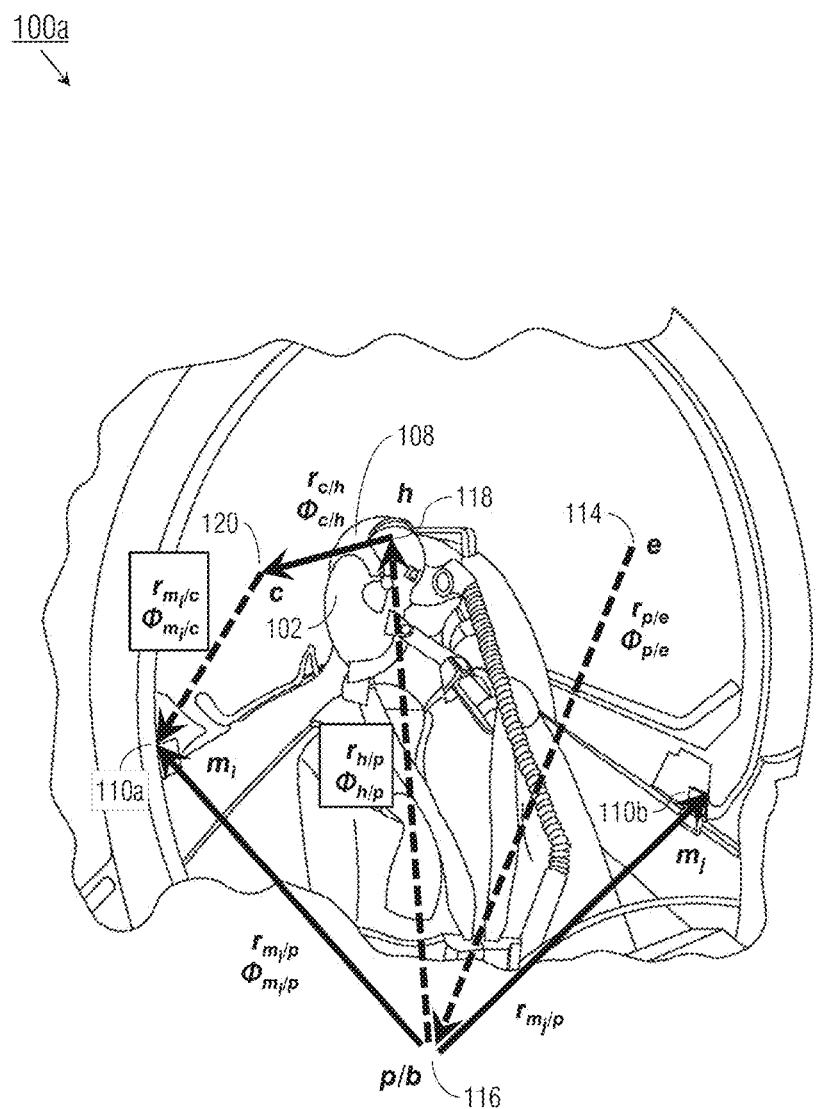
FIG. 2B illustrates relative position translations and rotations between the reference frames of FIG. 2A.

Referring now to FIG. 2B, the various reference frames of the hybrid headtracking system 100a may be defined in terms of poses, e.g., position translations (r) and orientational rotations ($\phi$) relative to each other. As previously noted, some of these poses may be associated with fixed translations and rotations, while others vary with time as components move relative to each other. For example, the camera 108 may be rigidly mounted to the head of the user 104 (via the helmet 102 worn by the user), so the pose $r_{c/h}$, $\Phi_{c/h}$ of the camera c (108) relative to the head frame h (118) may be fixed. Similarly, if the fiducial markers 110a-b are rigidly mounted to various fixed locations within the aircraft 106, the respective poses $r_{m_i/p}$, $\Phi_{m_i/p}$ and $r_{m_j/p}$, $\Phi_{m_j/p}$ of the aircraft 106 relative to each fiducial marker 110a, 110b may be fixed. However, both the head of the user 104 (via the helmet 102) and the camera 108 (rigidly mounted to the helmet 102) may frequently change position and orientation relative to the platform frame 116 as well as the earth frame 114 as the user 104 moves inside the aircraft 106, which itself moves relative to the earth. Accordingly, the poses $r_{h/p}$, $\Phi_{h/p}$ (of the aircraft 106 relative to the head frame 118), $r_{p/e}$, $\Phi_{p/e}$ (of the earth relative to the platform frame 116), and $r_{m_i/c}$, $\Phi_{m_i/c}$ (of the camera 108 relative to the fiducial marker 110a) may vary over time. Based on pose data of the head of the user 104 (relative to the head frame 118, as determined by the head-mounted IMU) and pose data of the aircraft 106 (relative to the platform frame 116 or earth frame 114, as determined by the platform-mounted IMU), the hybrid headtracking system 100a may track the relative pose $r_{p/h}$, $\Phi_{p/h}$ of the head frame 118 relative to the platform frame 116 (and/or the relative pose $r_{e/h}$, $\Phi_{e/h}$ of the earth frame 114 relative to the platform frame 116) in order to track the relative pose of the head of the user 104 relative to the aircraft 106.

Figure 3:
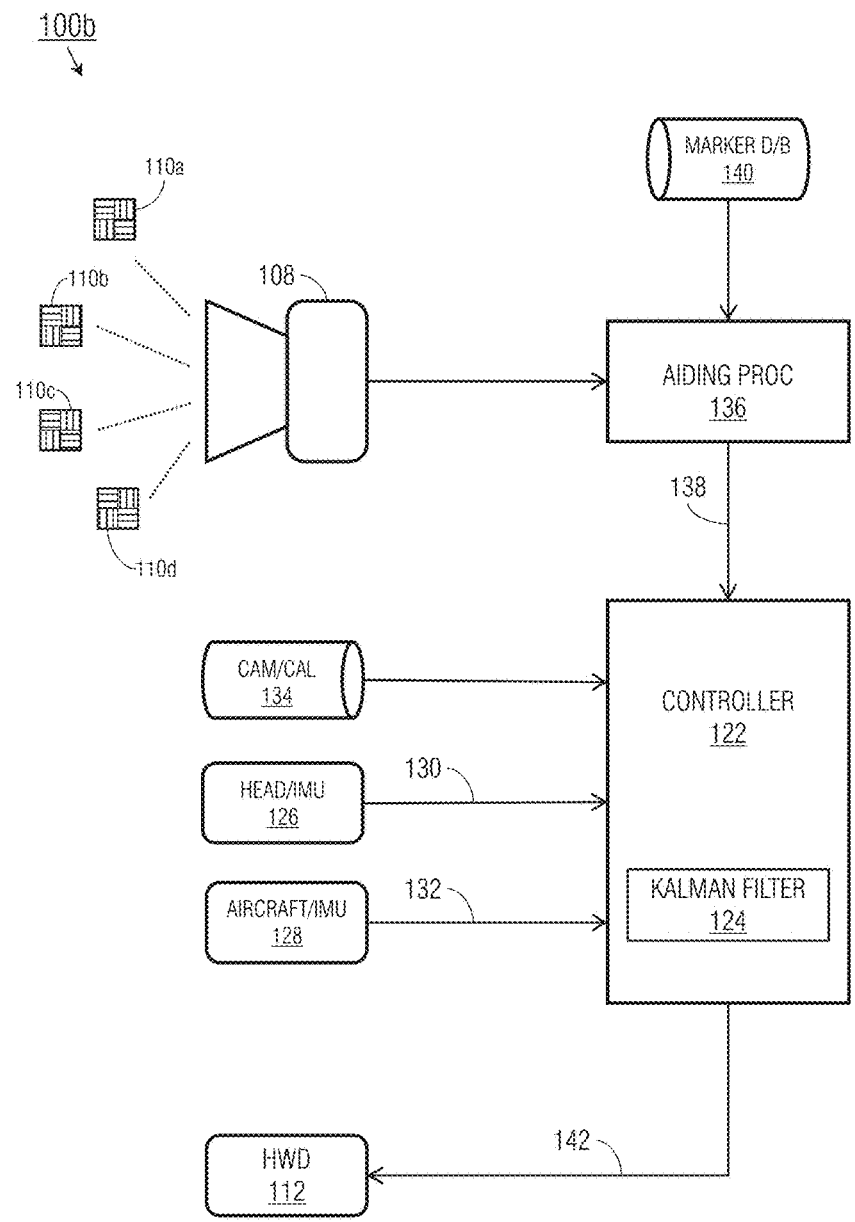
FIG. 3 is a diagrammatic illustration of an optically aided system of FIG. 1.

Referring to FIG. 3, the hybrid headtracking system 100b may be implemented and may function similarly to the hybrid headtracking system 100a of FIG. 2A, except that the hybrid headtracking system 100b may incorporate as an aiding device an optical tracker including a camera 108 and a constellation of fiducial markers 110a-d (e.g., at least four fiducial markers rigidly mounted to either the aircraft (106, FIG. 1; e.g., mounted inside the cockpit for detection by a head-mounted camera) or the helmet (102, FIG. 1). For example, the hybrid headtracking system 100b may include a controller 122 incorporating control processors on which a numerically stable Kalman filter (124) incorporating UD-factorization is configured to execute. The controller 122 may receive inertial solutions from the hIMU (126) and pIMU (128); for example, the hIMU 126 may estimate the head pose (130) relative to either the platform frame (116, FIGS. 2A/B) or earth frame (114, FIGS. 2A/B). Similarly, the pIMU 128 may estimate (132) the pose of the aircraft (106, FIG. 1) relative to the earth frame 114. The pIMU 128 may be a georeferenced/GPS-assisted or high-accuracy inertial reference system (IRS), embedded GPS/internal navigation system (EGI) or attitude and heading reference system (AHRS), while the hIMU 126 may be a compact, low-integrity, or microelectromagnetic (MEMS) IMU. It is assumed that any bias or scale factor errors in accelerations or rotational rates are negligible and may be ignored.

Based on the estimated head pose 130 and estimated aircraft pose 132, the controller 122 may determine an initial estimated head pose relative to the aircraft frame as well as error models associated with each pose estimate 130, 132. For example, error modeling may attempt to account for offsets (e.g., uncertainties) between the head of the user (104, FIGS. 2A/B) and the location of the camera (108, FIGS. 2A/B) which may affect the estimated head pose 130 determined by the hIMU 126 (e.g., $r_{c/h}$, $\Phi_{c/h}$). For example, the estimated head pose 130 may be associated with a 6DOF offset, e.g., three positional degrees and three rotational degrees. Similarly, offsets between the fiducial markers 110a-d and the aircraft 106 may affect the estimated aircraft pose 132 determined by the pIMU 238. Error modeling may thus represent accurate estimates of uncertainties within the hybrid headtracking system 100*b*; while it is possible to show that first-order error models are sufficiently accurate to meet integrity requirements (e.g., according to the following non-limiting examples), embodiments of the hybrid headtracking system 100*b* may incorporate higher-order error models as well.

For example, the position of the head of the user 104 may be defined relative to the platform frame 116 (or body frame) according to the equation $$r_{h/b} = \hat{r}_{n/b} + \delta \hat{r}_{h/b} \qquad 1)$$

wherein the true value $r_{h/b}$ of the body-to-head position is defined as a function of the estimated body-to-head position $\hat{r}_{h/b}$ and the error $\delta \hat{r}_{h/b}$.

The time derivative $v_{h/b}$ of the body-to-head position value $r_{h/b}$ may be used (e.g., by the Kalman filter 124) to propagate the estimated head pose forward in time between updates from the aiding system (e.g., camera 108 and fiducial markers 110*a-d*). The time derivative may be defined according to the equation $$v_{h/b} = \hat{v}_{h/b} \delta \hat{v}_{h/b} \qquad 2)$$

wherein the true value $v_{h/b}$ is defined as a function of the estimated value $\hat{v}_{h/b}$ and the error $\delta \hat{v}_{h/b}$ (as expressed in the body frame b).

The head acceleration $\tilde{a}_{h/i}$ as measured by the hIMU 126 may be defined according to the equation $$\tilde{a}_{h/i} = a_{h/i} + a_{b,h} + \eta_{a,h} \qquad 3)$$

wherein the measured acceleration $\tilde{a}_{h/i}$ is a function of the true acceleration $a_{h/i}$, a bias term $a_{b,h}$, and a noise term $\eta_{a,h}$.

The body (platform) acceleration $\tilde{a}_{b/i}$ as measured by the hIMU 126 may be defined according to the equation $$\tilde{a}_{b/i} = a_{b/i} + a_{b,h} + \eta_{a,b} \qquad 4)$$

wherein the measured acceleration $\tilde{a}_{b/i}$ is a function of the true acceleration $a_{b/i}$, a bias term $a_{b,h}$, and a noise term $\eta_{a,p}$.

The body-to-head rotation $C_h^b$ between the body frame b and head frame 118 may be defined as a direction cosine matric (CCM) characterized by three Euler angles. For example, a first-order error model may define the true value $C_h^b$ according to the equation $$C_h^b \approx (I + [\phi \times]) \hat{C}_h^b \qquad 5)$$

as a function of the estimated value $\hat{C}_h^b$ and an error term $\Phi$, where $\Phi$ may be defined as a vector of three simultaneous rotations.

The head angular rate $\omega_{h/i}$ as measured by the hIMU 126 may be defined according to the equation $$\tilde{\omega}_{h/i} = \omega_{h/i} + \omega_{b,h} + \eta_{r,h} \qquad 6)$$

wherein the measured angular rate $\tilde{\omega}_{h/i}$ is a function of the true angular rate $\omega_{h/i}$, a bias term $\omega_{b,h}$, and a noise term $\eta_{r,h}$.

The platform/body angular rate $\omega_{b/i}$ as measured by the hIMU 126 may be defined according to the equation $$\tilde{\omega}_{b/i} = \omega_{b/i} + \eta_{r,b} \qquad 7)$$

wherein the measured angular rate $\tilde{\omega}_{b/i}$ is a function of the true angular rate $\omega_{b/i}$ and a noise term $\eta_{r,b}$ (assuming negligible bias).

The head angular rate bias $\omega_{b,h}$ (e.g., the low-frequency component of the error in the measured angular rate) may be defined according to the equation $$\omega_{b,h} = \hat{\omega}_{b,h} + \delta \hat{\omega}_{b,h} \qquad 8)$$

wherein the true value $\omega_{b,h}$ of the head angular rate bias is a function of the estimated value $\hat{\omega}_{b,h}$ and an error $\delta \hat{\omega}_{b,h}$.

Similarly to the body-to-head rotation $C_h^b$, the head-to-camera rotation $C_h^c$ (between the head frame 118 and the camera frame (120, FIGS. 2A/B) may be defined as a DCM characterized by three Euler angles; a first-order error model may define the true value $C_h^c$ according to the equation $$C_h^c = (I + [\delta b \times]) \hat{C}_h^c \qquad 9)$$

as a function of the estimated value $\hat{C}_h^c$ and an error term $\delta b$ defined as a vector of three simultaneous rotations.

The camera 108 associated with the optical tracker may be associated with an intrinsic camera calibration matrix (134). The camera calibration matrix 134 may express a linear camera; if the camera 108 is a non-linear camera, the camera calibration matrix 134 may express the camera if additional calibration is performed, e.g., to correct for radial and tangential distortion or to compensate for non-linear effects. For example, the camera calibration matrix K $$K = \begin{bmatrix} \alpha_x & s & x_0 \\ 0 & \alpha_y & y_0 \\ 0 & 0 & 1 \end{bmatrix} \qquad 10)$$

may be based on the camera focal length $\alpha_x$, $\alpha_y$ (in horizontal and vertical pixel width respectively), a camera principal point ($x_0$, $y_0$) (in pixels) and a camera skew parameter s (in pixels). For example, aiding processors (136) associated with the optical tracker (or, alternatively, the controller 122) may determine an expected pixel location of the fiducial markers 110*a-d* (in images captured by the camera 108) based on the known locations of each fiducial marker, the intrinsic and extrinsic properties of the camera 108 (e.g., respectively the camera calibration matrix K (134) and secondary head pose estimate 138 ($r_{c/h}$, $\Phi_{c/h}$)). The secondary head pose estimate 138 may be determined, e.g., by the aiding processors 136, based on the observed residual between the expected marker location and the measured marker location (as determined by the captured images). This secondary pose estimate 138 (e.g., measurement update) may be generated through any of a variety of approaches, e.g., snapshot (loosely coupled optical-inertial) or tightly coupled optical-inertial.

With respect to tightly coupled measurement updates generated by the optical tracker (e.g., based on three-dimensional coordinate sets corresponding to the location of each fiducial marker 110*a-d*, as determined by a constellation database 140 of marker identifiers and 3D coordinates), the controller 122 may determine error models corresponding to the secondary head pose estimate 138 determined by the optical tracker. For example, image measurements $\tilde{p}$ may be defined as a two-dimensional vector corresponding to each marker appearing in an image captured by the camera 108 according to the equation $$\tilde{p} = p + \delta \tilde{p} \qquad 11)$$

wherein the image measurements $\tilde{p}$ are defined as a function of the true value p and an error $\delta \tilde{p}$.

Similarly, the platform-to-marker position $r_{m/p}$ (or the location of each fiducial marker 110a-d in the platform frame 116) may be defined according to the equation $$r_{m/p} = \hat{r}_{m/p} + \delta r_{m/p} \quad 12)$$

wherein the true value $r_{m/p}$ of each marker location is a function of the expected (predicted) location $\hat{r}_{m/p}$ and an error $\delta r_{m/p}$.

With respect to loosely coupled measurement updates generated by the optical tracker (e.g., based on pixel locations corresponding to the fiducial markers 110a-d in the images captured by the camera 108) the camera-to-marker rotation may be defined by the quaternion $$q_c^m = \delta q_m^m \otimes q_c^{\tilde{m}} \quad 13)$$

and the measured camera-to-marker position $\tilde{r}_{m/c}$ (a function of $\tilde{p}$ and any errors in the camera calibration matrix K) defined by the equation $$\tilde{r}_{m/c} = r_{m/c} + \delta r_{m/c} \quad 14)$$

wherein the measured position $\tilde{r}_{m/c}$ is a function of the true value $r_{m/c}$ and an error term $\delta r_{m/c}$.

The controller 122 and Kalman filter 124 may generate head pose estimates (relative to the platform or body frame) by propagating rates and accelerations of the estimated head pose data (130) received from the hIMU 126 and the estimated aircraft pose data (132) from the pIMU 128 into a strapdown equation, e.g., $$r_{h/i} = r_{b/i} + r_{h/b} \quad 15)$$

to determine a predicted relative translation $\ddot{r}_{h/b}$ corresponding to an estimated relative position of the head relative to the body frame projected forward in time. By way of a non-limiting example (and disregarding any offsets between the hIMU 126/pIMU 128 and the origin of the body frame b), differentiating with respect to time twice in the inertial space:

$$D_i^2 r_{h/i} = D_i^2 r_{b/i} + D_i^2(r_{h/b}) \quad 16)$$

$$D_i^2 r_{h/i} = D_i^2 r_{b/i} + \ddot{r}_{h/b} + \dot{\omega}_{b/i} \times r_{h/b} + \\ 2(\omega_{b/i} \times \dot{r}_{h/b}) + \omega_{b/i} \times \dot{r}_{h/b} + \omega_{b/i} \times (\omega_{b/i} \times r_{h/b}) \quad 17)$$

which will hold for any arbitrary reference frame, so in the body frame b:

$$D_i^2 r_{h/i} = C_h^b f_{h/i}^h + g_m^b \quad 18)$$

$$D_i^2 r_{b/i} = f_{b/i}^b + g_m^b \quad 19)$$

and, therefore:

$$\ddot{r}_{h/b} = C_h^b f_{h/i}^h - \dot{\omega}_{b/i} \times r_{h/b} - \\ 2(\omega_{b/i} \times \dot{r}_{h/b}) - \omega_{b/i} \times \dot{r}_{h/b} - \omega_{b/i} \times (\omega_{b/i} - r_{h/b}) - f_{b/i}^b \quad 20)$$

Similarly, a projected relative rotation $\dot{C}_b^h$ (quaternion $\dot{q}_h^b$) may be determined via a strapdown equation, e.g., $$\dot{C}_b^h = C_b^h[\omega_{b/h}^h \times], [\omega \times] = \begin{bmatrix} 0 & -\omega_x & \omega_y \\ \omega_x & 0 & -\omega_z \\ -\omega_y & \omega_z & 0 \end{bmatrix} \quad 21)$$

and, using the additive property of angular velocities (and relative to the head frame h 118):

$$\omega_{h/i}^h = \omega_{h/b}^h + \omega_{b/i}^h \quad 22)$$

$$\omega_{h/i}^h = \omega_{h/b}^h + C_b^h \omega_{b/i}^b \quad 23)$$

$$\omega_{h/b}^h = \omega_{h/i}^h - C_b^h \omega_{b/i}^b \quad 24)$$

and therefore, substituting equation 24 into equation 21:

$$\dot{C}_h^b = C_h^b[(\omega_{h/i}^h - C_b^h \omega_{b/i}^b) \times] \quad 25)$$

$$\dot{C}_h^b = C_h^b[\omega_{h/i}^h \times] - [\omega_{b/i}^b \times] \quad 26)$$

or, as expressed in quaternion rotations (in the body frame b), $$\dot{q}_h^b = \frac{1}{2}\Omega(\omega_{h/b}^b)q_h^b, \Omega = \begin{bmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & \omega_z & 0 \end{bmatrix} \quad 27)$$

wherein the projected relative rotation $\dot{C}_b^h$ corresponds to an estimated relative rotation of the head relative to the body frame (or platform frame 116) projected forward one unit in time.

The Kalman fitter 124 may propagate forward in time the estimated head pose 130 and estimated aircraft pose 132, e.g., the measured head angular rate $\hat{\omega}_{b/i}$ and body acceleration $\hat{f}_{b/i}$ from the pIMU 128 (expressed in the body frame b) and the measured head acceleration $\hat{f}_{h/i}$ from the hIMU 126 (expressed in the head frame 118), along with their respective determined error models:

$$\hat{\omega}_{b/i}^b = \omega_{b/i}^b + \eta_{rb} \quad 28)$$

$$\hat{f}_{b/i}^b = f_{b/i}^b + \eta_{ab} \quad 29)$$

$$\hat{f}_{h/i}^h = f_{h/i}^h + a_{b,h} + \eta_{ab} \quad 30)$$

$$\delta\hat{\omega}_{b/i} = \eta_{rb} \quad 31)$$

to determine the estimated relative acceleration $\ddot{r}_{h/b}$ of the head relative to the body frame (or platform frame 116) and the error $\delta\ddot{r}_{h/b}$ in the estimated relative acceleration (as compared to the predicted relative translation $\ddot{r}_{h/b}$). For example:

$$\ddot{r}_{h/b}^b = C_h^b f_{h/i}^h - \dot{\omega}_{b/i}^b \times r_{h/b}^b - \\ 2(\omega_{b/i}^b \times \dot{r}_{h/b}^b) - \omega_{b/i}^b \times \dot{r}_{h/b}^b - \omega_{b/i}^b \times (\omega_{b/i}^b \times r_{h/b}^b) - f_{b/i}^b \quad 32)$$

-continued $$\ddot{r}_{h/b} = (I - [\Phi \times])C_h^b(f_{h/i}^h + \delta a_{b,h} + \eta_{ab}) - \quad 33)$$
$$(\omega_{b/i}^b + \eta_{rb}) \times (r_{h/b}^b + \delta r_{h/b}) - 2(\omega_{b/i}^b + \eta_{rb}) \times (\dot{r}_{h/b}^b + \delta \dot{r}_{h/b}) -$$
$$(\omega_{b/i}^b + \eta_{rb}) \times ((\omega_{b/i}^b + \eta_{rb}) \times (r_{h/b}^b + \delta r_{h/b})) - (f_{b/i}^b + \eta_{ab})$$

Based on the above, and assuming all errors are uncorrelated, the error $\delta \ddot{r}_{h/b}$ in the estimated relative acceleration may be defined as (referring to equation 20 above, and still in the body frame b):

$$\delta \ddot{r}_{h/b} = \ddot{\hat{r}}_{h/b}^b - \ddot{r}_{h/b}^b \quad 34)$$

$$\delta \ddot{r}_{h/b} = C_h^b \delta a_{b,h} + [(C_h^b f_{h/i}^h) \times]\Phi - [\dot{\omega}_{b/i}^b \times]\delta r_{h/b} - \quad 35)$$
$$2[\omega_{b/i}^b \times]\delta v_{h/b} - [\omega_{b/i}^b \times]^2 \delta r_{h/b} + C_h^b \eta_{ah} + [\delta r_{h/b} \times]\dot{\eta}_{rb} +$$
$$(2[\delta v_{h/b} \times] + [\omega_{b/i}^b \times][\delta r_{h/b} \times])\eta_{rb}$$

Similarly, the Kalman filter 124 may propagate forward the measured head angular rate $\tilde{\omega}_{h/i}^h$ from the hIMU 126 (expressed in the head frame 118), to determine a relative head orientation $\Phi$ with respect to the body frame (platform frame 116). By way of a non-limiting example, using the following error models (in the head frame h, 118):

$$\tilde{\omega}_{h/i}^h = \omega_{h/i}^h + \omega_{b,h} + \eta_{rh} \quad 36)$$

$$\hat{\omega}_{h/i}^h = \tilde{\omega}_{h/i}^h - \omega_{b,h} = \omega_{h/i}^h + \delta \hat{\omega}_{b,h} + \eta_{rh} \quad 37)$$

the head orientation $\Phi$ relative to the body frame may be defined in terms of the small quaternion $\delta q$ and then differentiated with respect to time:

$$q_b^h = \delta q_h^h \otimes \hat{q}_b^h \quad 38)$$

$$\dot{q}_b^h = \delta \dot{q}_h^h \otimes \hat{q}_b^h + \delta q_h^h \otimes \dot{\hat{q}}_b^h \quad 39)$$

$$\dot{q}_b^h = \frac{1}{2}\begin{bmatrix} \omega_{h/b}^h \\ 0 \end{bmatrix} \otimes q_b^h \quad 40)$$

which equation 40 may be expanded according to the following:

$$\frac{1}{2}\begin{bmatrix} \omega_{h/b}^h \\ 0 \end{bmatrix} \otimes q_b^h = \dot{q}_h^h \otimes \hat{q}_b^h + \delta q_h^h \otimes \dot{\hat{q}}_b^h \quad 41)$$

$$\delta q_h^h \otimes \dot{\hat{q}}_b^h = \frac{1}{2}\left( \begin{bmatrix} \omega_{h/b}^h \\ 0 \end{bmatrix} \otimes q_b^h - q_b^h \otimes \begin{bmatrix} \omega_{h/b}^h \\ 0 \end{bmatrix} \otimes \hat{q}_b^h \right) \quad 42)$$

$$\delta \dot{q}_h^h = \frac{1}{2}\left( \begin{bmatrix} \omega_{h/b}^h \\ 0 \end{bmatrix} \otimes \delta q_h^h - \delta q_h^h \otimes \begin{bmatrix} \omega_{h/b}^h \\ 0 \end{bmatrix} \right) \quad 43)$$

Substituting the above error models into equation 23 above results in an expression for the relative angular rate $\omega_{h/b}{}^h$ of the head relative to the body, as expressed in the body frame b:

$$\omega_{h/b}^h = (\hat{\omega}_{h/i}^h - \delta \hat{\omega}_{b,h} - \eta_{rh}) - C_b^h(I_3 + [\Phi \times])(\hat{\omega}_{b/i}^b - \eta_{rb}) \quad 44)$$

Similarly, substituting into equation 43:

$$\delta \dot{q}_h^h = \frac{1}{2}\left( \begin{bmatrix} \hat{\omega}_{h/i}^h - \delta \hat{\omega}_{b,h} - \eta_{rh}) - C_b^h(I_3 + [\Phi \times])(\hat{\omega}_{b/i}^b - \eta_{rb}) \\ 0 \end{bmatrix} \otimes \delta q_h^h - \quad 45)$$
$$\delta q_h^h \otimes \begin{bmatrix} (\hat{\omega}_{h/i}^h - \delta \hat{\omega}_{b,h} - \eta_{rh}) - C_b^h(I_3 + [\Phi \times])(\hat{\omega}_{b/i}^b - \eta_{rb}) \\ 0 \end{bmatrix} \right)$$

$$\delta \dot{q}_h^h = \frac{1}{2}\begin{bmatrix} (\hat{\omega}_{h/i}^h - C_b^h \hat{\omega}_{b/i}^b) \\ 0 \end{bmatrix} \otimes \delta q_h^h - \quad 46)$$
$$\frac{1}{2}\begin{bmatrix} \delta \hat{\omega}_{b,h} - \eta_{rh} - C_b^h[\Phi \times](\hat{\omega}_{b/i}^b - \eta_{rb}) \\ 0 \end{bmatrix} \otimes \delta q_h^h$$

and using the small quaternion definitions $$\delta q_h^h = \left[ \frac{1}{2}\Phi \quad 1 \right]^T \quad 47)$$

$$\delta \dot{q}_h^h = \left[ \frac{1}{2}\dot{\Phi} \quad 0 \right]^T \quad 48)$$

yields the following:

$$\begin{bmatrix} 1/2\dot{\Phi} \\ 0 \end{bmatrix} = \begin{bmatrix} -[\hat{\omega}_{h/b}^h \times] & 0 \\ 0 & 0 \end{bmatrix}\begin{bmatrix} 1/2\Phi \\ 0 \end{bmatrix} - \quad 49)$$
$$\frac{1}{2}\begin{bmatrix} \delta \hat{\omega}_{b,h} - \eta_{rh} - C_b^h[\Phi \times](\hat{\omega}_{b/i}^b - \eta_{rb}) \\ 0 \end{bmatrix}$$

$$\dot{\Phi} = -\left([\hat{\omega}_{h/b}^h \times] + C_b^h[\hat{\omega}_{b/i}^b \times]\right)\Phi - \delta \hat{\omega}_{b,h} - \eta_{rh} - C_b^h \eta_{rb} \quad 50)$$

and, referring back to equation 23:

$$\dot{\Phi} = -[\hat{\omega}_{h/i}^h \times]\Phi - \delta \hat{\omega}_{b,h} - \eta_{rh} - C_b^h \eta_{rb}. \quad 51)$$

When a secondary head pose estimate 138 (measurement update) arrives from the optical tracker (aiding processors 136), the Kalman fitter 124 may correct the time-propagated head pose estimates and error models based on the measurement update and corresponding error model, such that the error vector x, comprising the error states of the Kalman fitter, may be updated. By way of a non-limiting example, the optical tracker (camera 108, aiding processors 136, fiducial markers 110*a-d*) may provide loosely coupled relative updates (secondary head pose estimate 138) of the relative position and relative orientation of the head of the user 104 relative to the camera frame. With respect to the relative position update, for Kalman fitter error vector x:

$$x = \left[ \delta \hat{r}_{h/b}^b \quad \delta \hat{v}_{h/b}^b \quad \delta \hat{a}_{b,h} \quad \hat{\Phi} \quad \delta \hat{\omega}_{b,h} \quad \delta \hat{b} \right]^T \quad 52)$$

and noise residual z (e.g., the difference between measured marker positions $\tilde{r}$ and estimated marker positions $\hat{r}$ in the camera frame c):

$$z = [\,(\tilde{r}^c_{m/c} - \hat{r}^c_{m/c})\quad 2\delta q^m_c(2:4)\,] = Hx + R \qquad 53)$$

the Kalman filter measurement model may be updated (based on the secondary head pose estimate 138) such that (for x, z, and Jacobian H):

$$z = Hx + R \qquad 54)$$

$$H = [\,\hat{C}^b_c \quad 0_3 \quad 0_3 \quad 0_3 \quad 0_3 \quad [\hat{r}^c_{m/c}\times]\,] \qquad 55)$$

$$R = E[\delta\tilde{r}^c_{m/c}(\delta\tilde{r}^c_{m/c})^T] \qquad 56)$$

With respect to the relative orientation update, the error δq (noise residual z) between the measured orientation (quaternion $q_c^{\tilde{m}}$) and estimated orientation (quaternion $q_c^{\hat{m}}$) may update the Kalman fitter measurement model such that, for the above error vector x (where C(q) is the DCM equivalent of quaternion q):

$$z = 2\delta q^m_c(2:4) = Hx + R \qquad 57)$$

$$H = [\,0_3 \quad 0_3 \quad 0_3 \quad -C(q^m_h) \quad 0_3 \quad C(q^m_c)\,] \qquad 58)$$

$$R = E[\varphi\varphi^T] \qquad 59)$$

The corrected head pose data, based on the updated Kalman fitter measurements, may be forwarded (142) to the HWD 112 to ensure the display of accurate imagery and symbology.

With respect to tightly coupled measurement updates generated by the optical tracker (e.g., based on three-dimensional coordinate sets corresponding to the location of each fiducial marker 110a-d, as determined by the constellation database 140), the pixel location p of a marker m in an image captured by the camera 108 may be determined by the position of the fiducial markers 110a-d with respect to the camera 108 and the camera calibration matrix K (134). The marker position $r_{m/c}$ relative to the camera 108 may be expressed in terms of the camera frame c (120, FIGS. 2A/B) as a difference between marker position and camera position, and may be expanded to include the head position $r_{h/b}$, $r_{c/h}$, and $\Phi_{c/h}$ ($r_{c/h}$ and $\Phi_{c/h}$ representing the extrinsic calibration offset between the head frame h (118, FIGS. 2A/B) and camera frame 120). Then, for the above error vector x, estimated pixel location $\tilde{p}$, measured pixel location $\hat{p}$, noise residual z, and Jacobian H:

$$z = \tilde{p} - \hat{p} = Hx + \eta_z \qquad 60)$$

$$H = [\,H_{\delta r_{h/p}} \quad 0_3 \quad 0_3 \quad H_\Phi \quad 0_3 \quad H_{\delta b}\,] \qquad 61)$$

$$R = \sum_{\eta_z} = \sum_{\delta\tilde{p}} + H_{\delta r_{c/h}} \sum_{\delta r_{c/h}} H^T_{\delta r_{c/h}} + H_{\delta r_{m/p}} \sum_{\delta r_{m/p}} H^T_{\delta r_{m/p}}. \qquad 62)$$

Figures 4A, 4B:
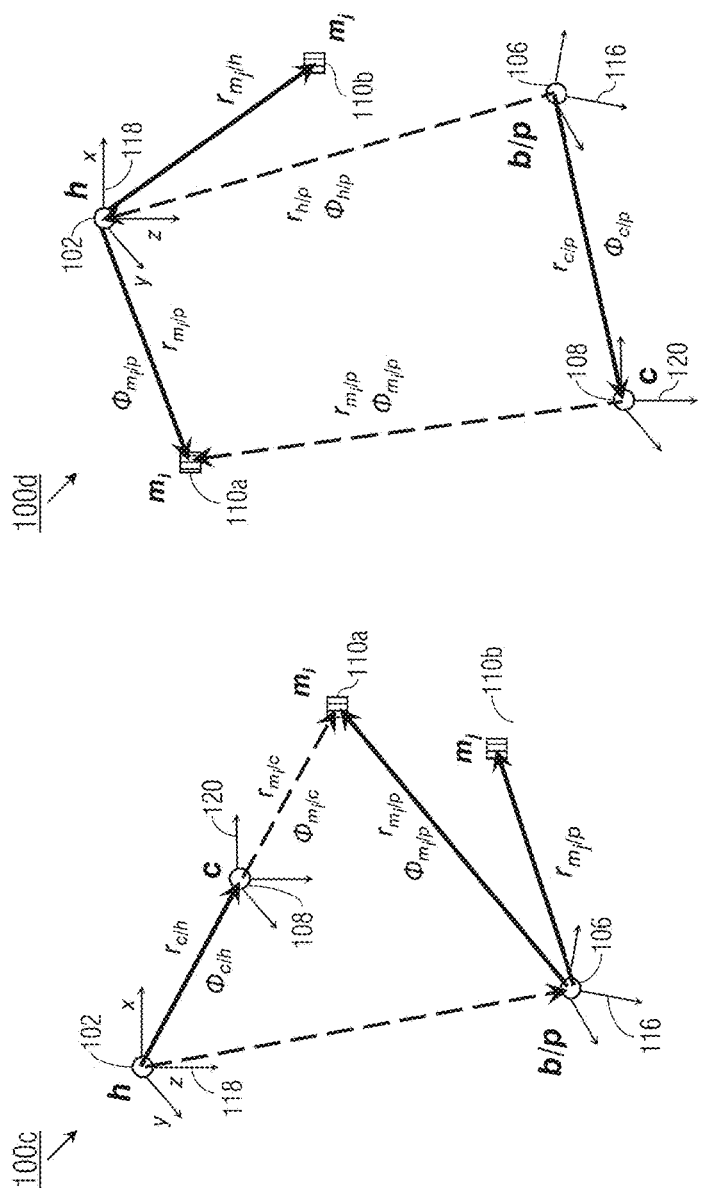
FIGS. 4A and 4B illustrate inside-out and outside-in configurations of the system of FIG. 1.

Referring now to FIG. 4A, the hybrid headtracking system 100c may be implemented and may function similarly to the hybrid headtracking system 100b of FIG. 3, except that the hybrid headtracking system 100c may be associated with an "inside-out" configuration. For example, with respect to the hybrid headtracking system 100c, the camera 108 may be rigidly mounted to the helmet 102 worn by the user (104, FIG. 1) and the fiducial markers 110a-b may be rigidly mounted to the aircraft 106 (or other like mobile platform). Accordingly, the position translations and rotations from the head frame 118 to the camera frame 120 ($r_{c/h}$, $\Phi_{c/h}$) and from the body frame (platform frame 116) to the fiducial markers 110a-b ($r_{m_i/b}$; $\Phi_{m_i/b}$; $r_{m_j/p}$, $\Phi_{m_j/p}$) are fixed.

Figure 5:
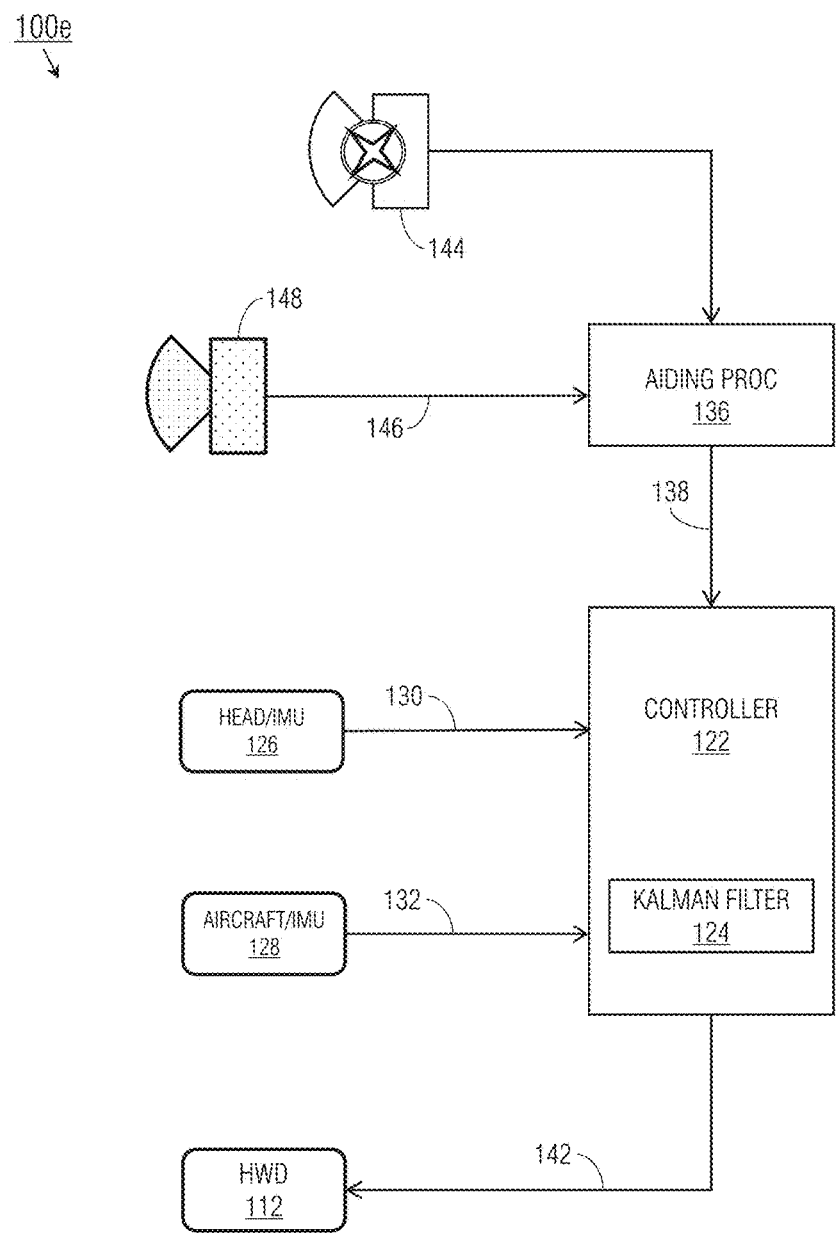
FIG. 5 is a diagrammatic illustration of a magnetically aided system of FIG. 1.

Referring now to FIG. 4B, the hybrid headtracking system 100d may be implemented and may function similarly to the hybrid headtracking system 100c of FIG. 4A, except that the hybrid headtracking system 100d may be associated with an "outside-in" configuration whereby the camera 108 is rigidly mounted to the aircraft 106, white the fiducial markers 110a-b are rigidly mounted to the helmet 102. Accordingly, with respect to "outside-in" configured hybrid headtracking systems 100d, the position translations and rotations from the camera frame 120 to the platform frame 116 ($r_{c/p}$, $\Phi_{c/p}$) and from the head frame 118 to the fiducial markers 110a-b ($r_{m_i/h}$, $\Phi_{m_i/h}$; $r_{m_j/h}$, $\Phi_{m_j/h}$) are fixed, while the translations and rotations from the camera frame to the fiducial markers ($r_{m_i/c}$, $\Phi_{m_i/c}$) and from the platform frame to the head frame ($r_{h/p}$, $\Phi_{h/p}$) may vary as these components move relative to each other, Referring now to FIG. 5, the hybrid headtracking system 100e may be implemented and may function similarly to the hybrid headtracking system 100b of FIG. 3, except that the hybrid headtracking system 100e may incorporate, in place of or in addition to the optical tracker of the hybrid headtracking system 100b, a magnetic tracker comprising a magnetometer 144 configured to measure (e.g., as a 3D vector) a known magnetic field (146) generated by a well-characterized magnetic source 148 and thereby generate the secondary head pose estimate 138. The magnetometer 144 and magnetic source 148 may be positioned in either an inside-out configuration, as shown by FIG. 4A (e.g., wherein the magnetometer 144 is rigidly mounted to the helmet (102, FIG. 4A) and the magnetic source 148 rigidly mounted to the aircraft (106, FIG. 4A)) or in an outside-in configuration as shown by FIG. 4B.

Figure 6A:
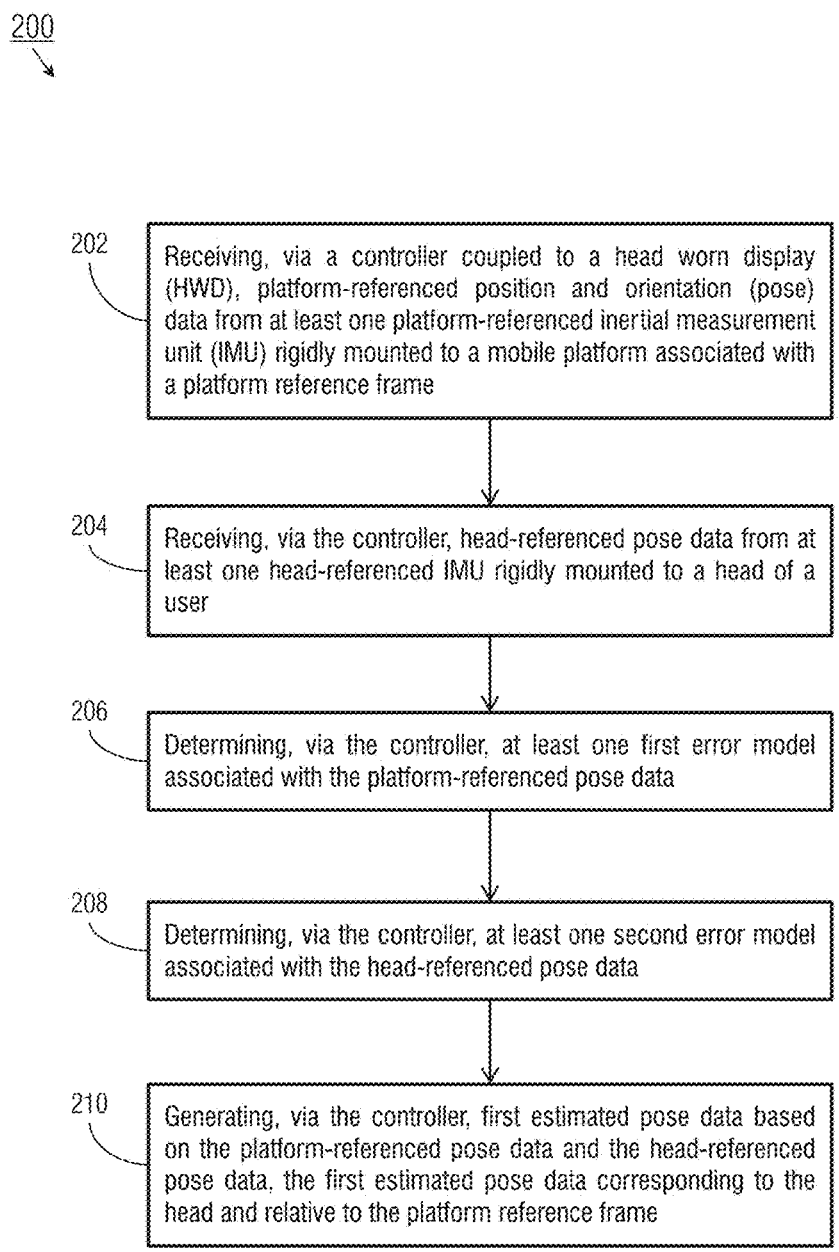
Figure 6C:
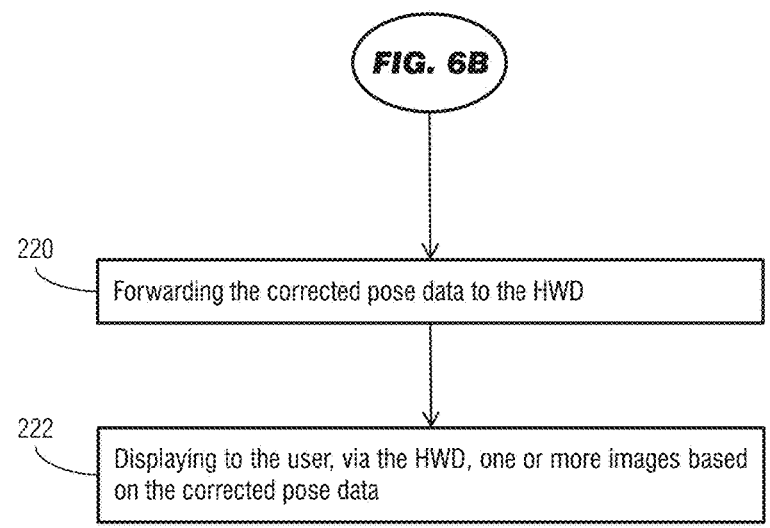

Referring now to FIGS. 6A through 6C, an exemplary embodiment of a method 200 for hybrid headtracking via a numerically stable Kalman filter incorporating UD-factorization according to the inventive concepts disclosed herein may be implemented by the hybrid headtracking system 100 in some embodiments, and may include one or more of the following steps.

Referring particularly to FIG. 6A, at a step 202 the controller of the hybrid headtracking system receives platform-referenced (relative to the platform/body frame) pose data from the pIMU. For example, the pIMU may be a high-integrity or GNSS-aided IMU, and the platform-referenced pose data may include georeferenced pose data relative to an earth or georeferenced frame.

At a step 204, the controller receives head-referenced pose data from the hIMU.

At steps 206 and 208, the controller determines error models corresponding respectively to the head-referenced pose data and the platform-referenced pose data. For example, determined error models may be based on uncertainties in the platform-referenced pose data and head-referenced pose data.

At a step 210, the controller may generate an initial estimate of the head pose relative to the platform frame, based on the head-referenced pose data, the platform-referenced pose data, and the respective error models.

Referring now to FIG. 6B, at a step 212 the Kalman filter may propagate forward through time the initial estimated pose data and the error models corresponding to the head-referenced pose data and platform-referenced pose data.

At a step 214, the controller may receive secondary estimated pose data (measurement updates) from an aiding device rigidly mounted to the head of the user and the aircraft. For example, the aiding device may include an optical tracker comprising a camera rigidly mounted to the head and a constellation of fiducial markers rigidly mounted to the aircraft or mobile platform; in some embodiments the camera may be mounted to the mobile platform and the fiducial markers to the aircraft. The aiding device may provide loosely coupled measurement updates, e.g., marker locations relative to a captured image and camera calibration data, or tightly coupled measurement updates, e.g., three-dimensional marker coordinates. The aiding device may include a magnetic tracker incorporating a magnetometer rigidly mounted to the head or helmet (or the aircraft) and a well characterized magnetic source.

At a step 216, the controller determines an error model corresponding to the received secondary estimated pose data. For example, the error model may be based on uncertainties in the secondary estimated pose data.

At a step 218, the Kalman filter generates at least one of corrected head pose data and a corrected error model based on the time-propagated pose data, the received secondary estimated pose data received from the aiding device, and the corresponding error model. For example, based on the received secondary estimated pose data, the Kalman filter may correct either or both of the error model corresponding to the head-referenced pose data and the error model corresponding to the platform-referenced pose data.

Referring now to FIG. 6C, the method 200 may include additional steps 220 and 222. At the step 220, the controller forwards the corrected head pose data to the head-worn display (HWD).

At the step 222, the HWD displays flight cues via imagery and symbology to the user, based on the received corrected pose data.

As will be appreciated from the above, systems and methods according to embodiments of the inventive concepts disclosed herein may provide a novel solution to the relative navigation problem, and thereby ensure the required integrity of flight cues, imagery, and symbology displayed to pilots via head-worn display by implementing a numerically stable, UD factorization of the Kalman filter to provide high accuracy platform-referenced or georeferenced head pose data, correcting for the inherent drift of inertial measurement units used to estimate the head pose.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A hybrid headtracking system incorporating a numerically stable Kalman fitter, comprising:
   at least one platform-referenced inertial measurement unit (IMU) configured to be rigidly mounted to a mobile platform associated with a platform reference frame, the at least one platform-referenced IMU configured to provide platform-referenced position and orientation (pose) data;
   at least one head-referenced IMU configured to be rigidly mounted to a head of a user, the head associated with a head reference frame, the at least one head-referenced IMU configured to provide head-referenced pose data;
   at least one aiding device configured to be rigidly mounted to at least one of the mobile platform and the head and to provide first estimated pose data, the at least one aiding device including at least one aiding sensor configured to generate the first estimated pose data based on one or more fiducial markers;
   and
   a controller configured to be coupled to the platform-referenced IMU, the head-referenced IMU, and the at least one aiding device, the controller including at least one processor configured to:
   receive the head-referenced pose data, the platform-referenced pose data, and the first estimated pose data;
   determine at least one of a first error model associated with the head-referenced pose data, a second error model associated with the platform-referenced pose data, and a third error model associated with the first estimated pose data;
   generate second estimated pose data based on the head-referenced pose data and the platform-referenced pose data;
   generate, via the numerically stable Kalman filter, time-propagated pose data based on the second estimated pose data and one or more of the first error model and the second error model;
   and
   generate, via the numerically stable Kalman fitter, at least one of corrected pose data and a corrected error model based on the time-propagated pose data, the first estimated pose data, and the at least one third error model.

2. The hybrid headtracking system of claim 1, wherein:
   the at least one head-referenced IMU includes at least one microelectromechanical (MEMS) IMU.

3. The hybrid headtracking system of claim 1, wherein:
   the at least one platform-referenced IMU is coupled to a georeferenced position sensor configured to generate georeferenced pose data corresponding to the mobile platform;
   and
   the platform-referenced pose data includes the georeferenced pose data.

4. The hybrid headtracking system of claim 1, wherein the at least one aiding device is an optical tracking system and:
   the at least one aiding sensor includes a camera;
   and
   the first estimated pose data includes camera calibration data associated with the camera.

5. The hybrid headtracking system of claim 4, wherein the first estimated pose data is associated with at least one of:

a location of the one or more fiducial markers relative to an image generated by the camera;
and
one or more coordinates corresponding to the one or more fiducial markers.

6. The hybrid headtracking system of claim 1, wherein the at least one aiding device is a magnetic tracking system and:
the at least one aiding sensor includes a magnetometer;
and
the one or more fiducial markers include at least one magnetic source.

7. The hybrid headtracking system of claim 1, wherein the controller is configured to correct, via the numerically stable Kalman filter, at least one of the first error model and the second error model based on at least the first estimated pose data.

8. A head-worn display (HWD) incorporating a hybrid headtracking system, comprising:
a controller including at least one control processor configured to:
receive platform-referenced position and orientation (pose) data from at least one platform-referenced IMU rigidly mounted to a mobile platform and associated with a platform reference frame;
receive head-referenced pose data from at least one head-referenced IMU rigidly mounted to a head of a user, the head associated with a head reference frame;
determine at least one first error model associated with the platform-referenced pose data;
determine at least one second error model associated with the head-referenced pose data;
generate first estimated pose data based on the head-referenced pose data and the platform-referenced pose data;
receive second estimated pose data from at least one aiding device rigidly mounted to one or more of the head and the mobile platform, the aiding device including at least one aiding sensor configured to generate the second estimated pose data based on one or more fiducial markers;
implement at least one numerically stable Kalman fitter configured to:
generate time-propagated pose data based on the first estimated pose data and one or more of the first error model and the second error model;
and
generate at least one of corrected pose data and a corrected error model based on the time-propagated pose data, the second estimated pose data, and the at least one third error model;
and
at least one display unit configured to be mounted to the head of the user, the at least one display unit comprising:
at least one display processor configured to receive the corrected pose data from the control processor;
and
at least one display surface configured to display one or more images to the user based on the received corrected pose data.

9. The HWD of claim 8, wherein one or more of the controller, the head-referenced IMU, the at least one aiding device, and the at least one display unit is rigidly mounted to a helmet wearable by the user.

10. The HWD of claim 8, wherein:
the at least one platform-referenced IMU is coupled to at least one georeferenced position sensor configured to generate georeferenced pose data corresponding to the mobile platform;
and
the platform-referenced pose data includes the georeferenced pose data.

11. The HWD of claim 8, wherein the at least one aiding device is an optical tracking system and:
the at least one aiding sensor includes a camera;
and
the second estimated pose data includes camera calibration data associated with the camera.

12. The HWD of claim 11, wherein the second estimated pose data is associated with at least one of:
a location of the one or more fiducial markers relative to an image generated by the camera;
and
one or more coordinates corresponding to the one or more fiducial markers.

13. The HWD of claim 8, wherein the at Least one aiding device is a magnetic tracking system and:
the at least one aiding sensor includes a magnetometer;
and
the one or more fiducial markers include at least one magnetic source.

14. A method for hybrid headtracking via a numerically stable Kalman filter, the method comprising:
receiving, via a controller coupled to a head worn display (HWD), platform-referenced position and orientation (pose) data from at least one platform-referenced inertial measurement unit (IMU) rigidly mounted to a mobile platform associated with a platform reference frame;
receiving, via the controller, head-referenced pose data from at least one head-referenced IMU rigidly mounted to a head of a user;
determining, via the controller, at least one first error model associated with the platform-referenced pose data;
determining, via the controller, at least one second error model associated with the head-referenced pose data;
generating, via the controller, first estimated pose data based on the platform-referenced pose data and the head-referenced pose data, the first estimated pose data corresponding to the head and relative to the platform reference frame;
generating, via a Kalman filter associated with the controller, time-propagated pose data based on the first estimated pose data, the first error model, and the second error model;
receiving, via the controller, second estimated pose data from at least one aiding device coupled to the controller, the aiding device rigidly mounted to at least one of the head and the mobile platform;
determining, via the controller, at least one third error model associated with the second estimated pose data;
and
generating, via the Kalman filter, at least one of corrected pose data and a corrected error model based on the time-propagated pose data, the second estimated pose data, and the third error model.

15. The method of claim 14, wherein receiving, via a controller coupled to a head worn display (HWD), platform-referenced position and orientation (pose) data from at least one platform-referenced inertial measurement unit (IMU)

rigidly mounted to a mobile platform associated with a platform reference frame includes:

receiving, via a controller coupled to a HWD, platform-referenced pose data from at least one GNSS-aided platform-referenced IMU rigidly mounted to a mobile platform associated with a platform reference frame, the platform-referenced pose data including georeferenced pose data corresponding to the mobile platform.

16. The method of claim 14, wherein receiving, via the controller, second estimated pose data from at least one aiding device coupled to the controller, the aiding device rigidly mounted to at least one of the head and the mobile platform includes:

receiving, via the controller, second estimated pose data from at least one optical tracker coupled to the controller, the optical tracker comprising a camera and one or more fiducial markers, the second estimated pose data including calibration data associated with the camera.

17. The method of claim 16, wherein receiving, via the controller, second estimated pose data from at least one optical tracker coupled to the controller, the optical tracker comprising a camera and one or more fiducial markers, the second estimated pose data including calibration data associated with the camera includes:

receiving, via the controller, second estimated pose data from at least one optical tracker coupled to the controller, the optical tracker comprising a camera and one or more fiducial markers, the second estimated pose data including at least one of a) a location of the one or more fiducial markers relative to an image captured by the camera and b) a coordinate corresponding to the one or more fiducial markers.

18. The method of claim 14, wherein receiving, via the controller, second estimated pose data from at Least one aiding device coupled to the controller, the aiding device rigidly mounted to at Least one of the head and the mobile platform includes:

receiving, via the controller, second estimated pose data from at least one magnetic tracker coupled to the controller, the magnetic tracker comprising a magnetometer and one or more magnetic sources.

19. The method of claim 14, wherein generating, via the Kalman filter, at least one of corrected pose data and a corrected error model based on the time-propagated pose data, the second estimated pose data, and the third error model includes:

correcting, via the Kalman filter, at least one of the first error model and the second error model based on at least the second estimated pose data.

20. The method of claim 14, further comprising:

forwarding the corrected pose data to the HWD; and displaying to the user, via the HWD, one or more images based on the corrected pose data.

* * * * *